US012747860B2

(12) United States Patent
Gunner et al.

(10) Patent No.: US 12,747,860 B2
(45) Date of Patent: Sep. 29, 2026

(54) FURNACE SYSTEM

(71) Applicant: Owens-Brockway Glass Container Inc., Perrysburg, OH (US)

(72) Inventors: Bruce Gunner, Maumee, OH (US); Benjamin Brown, Holland, OH (US); James Dimitry, Toronto (CA)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 50 days.

(21) Appl. No.: 18/643,814

(22) Filed: Apr. 23, 2024

(65) Prior Publication Data

US 2025/0327573 A1 Oct. 23, 2025

(51) Int. Cl.
*F23L 15/02* (2006.01)
*F27D 17/10* (2025.01)

(52) U.S. Cl.
CPC .............. *F23L 15/02* (2013.01); *F27D 17/10* (2025.01)

(58) Field of Classification Search
CPC .......... F23L 15/02; F27D 17/10; F27D 17/13; F27D 17/18; Y02P 40/50; C03B 3/023; C03B 5/237
See application file for complete search history.

(56) References Cited

U.S. PATENT DOCUMENTS 4,407,669 A 10/1983 Nelson
4,528,012 A 7/1985 Sturgill
4,655,436 A * 4/1987 Williams ................ F27D 17/10 432/9
4,696,690 A 9/1987 Roloff
4,875,919 A 10/1989 DeSaro et al.
5,006,141 A 4/1991 Chen et al.
5,044,424 A * 9/1991 Monro .................... F23L 15/04 165/5
5,125,943 A 6/1992 Cole
(Continued)

FOREIGN PATENT DOCUMENTS

CN 11928650 A 11/2020
DE 102012210753 A1 1/2014
JP S57061636 A 4/1982

OTHER PUBLICATIONS

Int. Search Report and Written Opinion, Int. Application No. PCT/US2025/025103, International Filing Date: Apr. 17, 2025, Applicant: Owens-Brockway Glass Container Inc., Date: Aug. 4, 2025.

*Primary Examiner* — Patrick C Williams

(57) ABSTRACT

A furnace system includes a regenerative furnace with a melting tank and first and second regenerators. In a forward operating mode, combustion air enters and travels through the first regenerator before exiting the first regenerator into the melting tank while exhaust fluids exit the melting tank into the second regenerator and travels through the second regenerator before exiting the second regenerator. In a reverse operating mode, the flow is reversed. The system also includes a preheater for preheating materials supplied to the melting tank. Portions of the combustion air traveling through the first regenerator in the forward operating mode and the second regenerator in the reverse operating mode are diverted before entering the melting tank and mixed with fluids exhausted from the fluid outlet of the preheater for delivery to the fluid inlet of the preheater.

20 Claims, 1 Drawing Sheet

(56) References Cited

U.S. PATENT DOCUMENTS

| | | | | |
|---|---|---|---|---|
| 5,290,334 | A | 3/1994 | Alexander | |
| 5,773,529 | A | 6/1998 | Alexander | |
| 5,779,748 | A | 7/1998 | Alexander | |
| 5,816,796 | A * | 10/1998 | Broach | F27D 17/10 432/209 |
| 5,954,851 | A | 9/1999 | Sakae | |
| 6,113,874 | A | 9/2000 | Kobayashi | |
| 2008/0289364 | A1 | 11/2008 | Pinkham, Jr. et al. | |
| 2015/0210581 | A1 | 7/2015 | Sorg et al. | |
| 2016/0231058 | A1 | 8/2016 | Carolla et al. | |
| 2016/0334163 | A1 * | 11/2016 | Bourdon | F01K 13/02 |
| 2020/0317556 | A1 * | 10/2020 | Fayerweather | C03B 1/00 |

* cited by examiner

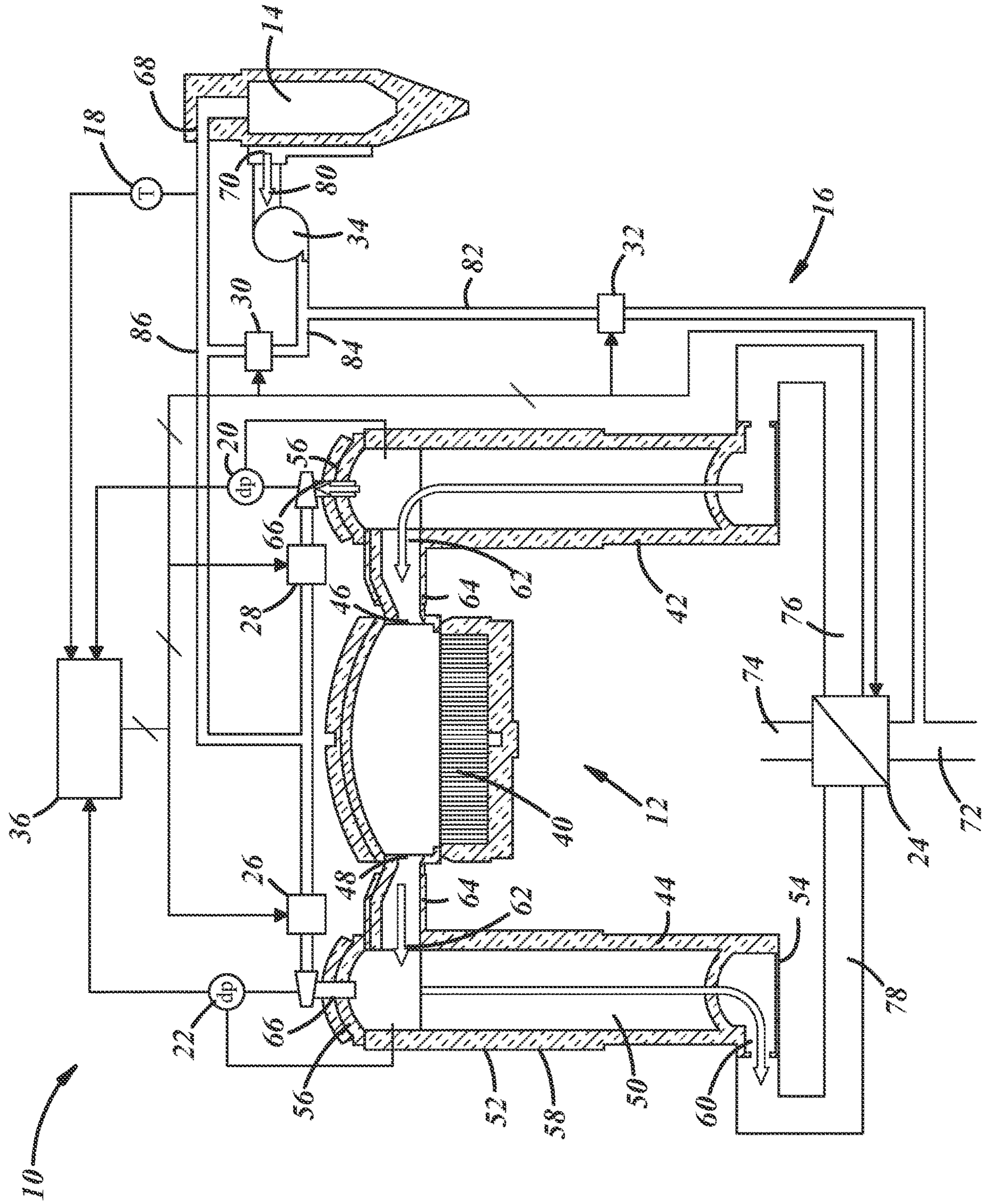
14
68
18
T
70
80
34
16
82
32
30
86
84
20
dp
56
66
62
42
28
46
64
76
74
36
40
12
24
72
26
48
64
62
44
54
22
dp
66
56
52
58
50
60
78
10

FURNACE SYSTEM

TECHNICAL FIELD

This disclosure relates to furnace systems. In particular, the disclosure relates to a system in which combustion air traveling through either of two regenerators in a regenerative furnace is used to heat materials in a preheater providing raw materials to the furnace.

BACKGROUND

Furnace systems often employ preheaters to preheat raw materials before entry of the materials into a melting tank. In a glass melting furnace system, for example, a preheater is used to preheat cullet (recycled broken glass) that is then fed to a glass melting furnace along with other raw materials. Preheating materials before entry into the melting tank enhances the ability of different materials to mix within the chamber, can increase the capacity of the furnace, and can improve the efficiency of the furnace by making use of residual heat generated by the furnace.

Preheaters frequently use recycled exhaust gases from the melting tank to supply heat to the materials within the preheater. This approach works well in many conventional gas/oxygen furnace systems. In a regenerative furnace, however, the heat from the exhaust gases is primarily used to heat the combustion air prior to entry of the combustion air into the melting tank. In particular, a regenerative furnace typically includes a pair of regenerators in fluid communication with the melting tank. Combustion air flows through an upstream regenerator into the melting tank and exhaust gases flow out of the melting tank through a downstream regenerator. The exhaust gases transfer heat to the downstream regenerator and, after a period of time, the fluid flow through the furnace and regenerators is reversed with combustion air traveling through the newly heated regenerator before entering the melting tank. Because the heat from the exhaust gases is transferred to the downstream regenerator, the exhaust gases exiting the downstream regenerator lack sufficient heat for use by preheaters and the benefits of preheaters are difficult to realize in regenerative furnace systems.

SUMMARY OF THE DISCLOSURE

The present disclosure embodies a number of aspects that can be implemented separately from or in combination with each other.

A furnace system in accordance with one embodiment of the present disclosure includes a regenerative furnace. The furnace includes a melting tank having first and second fluid ports. The furnace further includes a first regenerator having a lower port disposed proximate a lower of the first regenerator, a upper port disposed proximate a upper of the first regenerator and in fluid communication with the first fluid port of the melting tank, and an intermediate port disposed between the lower and upper ports of the first regenerator. The furnace further includes a second regenerator having a lower port disposed proximate a lower of the second regenerator, a upper port disposed proximate a upper of the second regenerator and in fluid communication with the second fluid port of the melting tank, and an intermediate port disposed between the lower and upper ports of the second regenerator. In a forward operating mode, combustion air enters the lower port of the first regenerator and exits the upper port of the first regenerator into the melting tank and exhaust fluids from the melting tank enter the upper port of the second regenerator and exits the lower port of the second regenerator. In a reverse operating mode, combustion air enters the lower port of the second regenerator and exits the upper port of the second regenerator into the melting tank and exhaust fluids from the melting tank enter the upper port of the first regenerator and exits the lower port of the first regenerator. The furnace system further includes a preheater for preheating materials supplied to the melting tank. The preheater includes a fluid inlet and a fluid outlet. A portion of the combustion air traveling through the first regenerator in the forward operating mode is diverted through the intermediate port of the first regenerator prior to reaching the upper port of the first regenerator and mixed with fluids exhausted from the fluid outlet of the preheater before delivery to the fluid inlet of the preheater. A portion of the combustion air traveling through the second regenerator in the reverse operating mode is diverted through the intermediate port of the second regenerator prior to reaching the upper port of the second regenerator and mixed with fluids exhausted from the fluid outlet of the preheater before delivery to the fluid inlet of the preheater.

A furnace system in accordance with another embodiment of the present disclosure includes a preheater for preheating materials to be supplied to a melting tank, the preheater including a fluid inlet and a fluid outlet, and a duct system in fluid communication with the preheater. The duct system includes a preheater outlet duct to transmit exhaust fluids from the preheater fluid outlet, a preheater intake duct to transmit a mixture of combustion air and recirculated exhaust fluids from the preheater fluid outlet to the preheater fluid inlet, a preheater recirculation duct to transmit a portion of the exhaust fluids from the preheater outlet duct to the preheater intake duct, and a preheater exhaust duct to transmit another portion of the exhaust fluids from the preheater outlet duct out of the duct system. The furnace system also includes a recirculation valve to control an amount of flow of exhaust fluids from the preheater outlet duct into the preheater intake duct to control the temperature of the mixture of combustion air and recirculated exhaust fluids into the preheater, and a temperature sensor to generate a temperature signal indicative of a fluid temperature between the preheater fluid inlet and a junction of the preheater recirculation duct and the preheater intake duct. The furnace system further includes a controller in communication with the temperature sensor and the recirculation valve to receive temperature input signals from the temperature sensor indicative of temperature of the mixture of combustion air and recirculated exhaust fluids in the preheater intake duct, to process the temperature input signals, and to transmit valve position output signals to the recirculation valve to adjust an opening amount of the recirculation valve to control the temperature of the mixture of combustion air and recirculated exhaust fluids in the preheater intake duct.

BRIEF DESCRIPTION OF THE DRAWINGS

FIG. 1 is a diagrammatic drawing of a furnace system in accordance with one embodiment of the present disclosure.

DETAILED DESCRIPTION

Referring now to the drawings, FIG. 11 illustrates a furnace system 10 in accordance with one embodiment of the present disclosure. System 10 is provided to melt raw materials for use in forming objects or products. System 10 may comprise, for example, a glass melting furnace system for use in melting silica sand, soda ash (sodium carbonate), limestone and cullet (recycled broken glass) into molten glass. System 10 may include a furnace 12, a preheater 14, a duct system 16, sensors 18, 20, 22, fluid control valves 24, 26, 28, 30, 32, a fan 34, and a controller 36.

Furnace 12 is provided to melt raw materials. As noted above, in one embodiment, furnace 12 may comprise a glass melting furnace that melts silica sand, soda ash, limestone and cullet into molten glass. Furnace 12 may have an operating temperature of about 1565 degrees Celsius (2850 degrees Fahrenheit). Furnace 12 may generate heat using fuel, for example, natural gas, and preheated combustion air. Furnace 12 may also augment the heat using an electric boost system. Excess heat may be exhausted from furnace 12 through duct system 16. Furnace 12 comprises a regenerative furnace and includes a melting tank 40 and a pair of regenerators 42, 44.

Melting tank 40 comprises a chamber in which raw materials are received and melted during the melting process. Tank 40 may comprise a covered, generally rectangular chamber having sufficient depth to retain a molten mixture of materials at a predetermined or desirable level within the chamber and a space above the mixture for introduction of combustion gases. Tank 40 includes fluid ports 46, 48, for entry of combustion gases and exhaustion of exhaust gases from and to regenerators 42, 44. Although only two fluid ports 46, 48 are shown in the drawing, it should be understood that tank 40 may include additional fluid ports (e.g., spaced at regular intervals along the length of tank 40 and in fluid communication with regenerators 42, 44).

Regenerators 42, 44 are provided to heat combustion air before entry into tank 40 and to recapture heat from exhaust gases exhausted from tank 40. In the illustrated embodiment, furnace 12 is configured as a side-fired regenerative furnace. It should be understood, however, that furnace 12 could alternatively be configured as an end-fired regenerative furnace with regenerators 42, 44 located at one longitudinal end (or opposite longitudinal ends) of tank 40. Regenerators 42, 44 each include an arrangement 50 of bricks, tiles and/or stones supported within a housing 52. The bricks, tiles and/or stones may be bonded to one another and may be arranged in a checkerwork, lattice, honeycomb or array like structure. The bricks, tiles and/or stones, define heat exchange surfaces that capture heat from exhaust gases exiting tank 40 and later transfer that heat to combustion air when the flow of fluids through furnace 12 is reversed.

Housing 52 supports the arrangement 50 of bricks, tiles and/or stones and defines passageways for the flow of fluids. The housing 52 of each regenerator 42, 44 may be shaped generally in the form of a rectangular prism and may define a floor 54, ceiling 56, and side walls 58 and end walls extending between the floor 54 and ceiling 56. The arrangement 50 of bricks, tile and/or stones may be supported by side walls 58 and/or end walls and spaced from the floor and ceiling 54, 56 of the housing 52.

The housing 52 of each regenerator 42, 44 defines one or more lower ports 60 that may be disposed proximate floor 54 and through which combustion air enters, and exhaust gases exit, the regenerator 42, 44. The housing 52 also defines one or more upper ports 62 that may be disposed proximate ceiling 56 of the regenerator 42, 44 and through which combustion air exits, and exhaust gases enter, the regenerator 42, 44. The upper ports 62 are connected to the ports 46, 48 in melting tank 40 by firing passages 64 in which the combustion air may be mixed with natural gas or another fuel introduced into the passage to initiate the combustion process. In other embodiments, the furnace 12 may be configured for underport firing, where combustion air is mixed with natural gas, or other fuel, inside the furnace 12. Although only a single lower port 60 and a single upper port 62 are shown in the drawing, it should be understood that each regenerator 42, 44 may include a plurality of lower ports 60 and/or a plurality of upper ports 62. Each regenerator 42, 44 may include, for example, a plurality of upper ports 62 spaced along the length of a regenerator 42, 44 and aligned with corresponding firing passages 64 and ports 46, 48 in melting tank 40.

In accordance with one aspect of the present disclosure, the housing 52 of each regenerator 42, 44 may further define one or more intermediate ports 66 disposed between the lower port 60 and upper port 62 relative to the path of fluid flow between the lower and upper ports 60, 62. In the illustrated embodiment, intermediate ports 66 are disposed in the ceilings 56 of regenerators 42, 44 at an apex of regenerators 42, 44. In other embodiments, the intermediate ports 66 may be disposed in the side walls 58 relatively proximate the ceilings 56 of the regenerators 42, 44. During a forward operating mode, combustion air enters lower port 60 in regenerator 42 and exits intermediate port 66 and upper port 62 in regenerator 42 for delivery to preheater 14 and melting tank 40, respectively. Exhaust fluids from melting tank 40 enter upper port 62 of regenerator 44 and exit lower port 60 of regenerator 44. In a reverse operating mode, combustion air enters lower port 60 in regenerator 44 and exits intermediate port 66 and upper port 62 in regenerator 44 for delivery to preheater 14 and melting tank 40, respectively. Exhaust fluids from melting tank 40 enter upper port 62 of regenerator 42 and exit lower port 60 of regenerator 42.

Preheater 14 is provided to preheat materials before they are introduced into furnace 12 to improve the operating efficiency of furnace 12. In the glass melting furnace system reference above, preheater 14 comprises a cullet preheater that is used to preheat cullet before the cullet is provided to furnace 12. The cullet preheater 14 may comprise a direct contact raining bed counterflow preheater in which cullet is introduced at one end of the preheater and flows through the preheater around deflector plates under gravitational forces while heat is introduced into the opposite end of the preheater and flows in the opposite direction to the cullet. It should be understood, however, that other forms of preheaters 14, for cullet, raw batch materials, or the like may alternatively be used in system 10. Cullet may be introduced to preheater 14 through a cullet inlet from one or more silos (not shown) and may exit an opposite end of the preheater 14 through a cullet outlet and be provided to melting tank 40 (e.g., by a charger). In between, cullet flows through the preheater 14 around deflector plates. Heat may be introduced to preheater 14 through a fluid intake or inlet 68 and exhaust fluids may exit preheater 14 through a fluid outlet 70. In accordance with the present disclosure, the heat introduced to preheater 14 through inlet 68 is generated by combining a portion of the combustion air flow in regenerators 42, 44 with a portion of the exhaust fluids exhausted from preheater 14.

Duct system 16 is provided to route fluids between furnace 12, preheater 14, and other components (not shown) of system 10 as well as the atmosphere (for air intake and byproduct exhaustion). System 16 is made from materials sufficient to withstand the anticipated operating temperatures in the components of system 10 and may be made from steel in some embodiments. Mechanically or electrically controlled valves, including valves 24, 26, 28, 30, 32 may be disposed within duct system 16 to control the amount of fluid flowing to and from various components of furnace system 10. System 16 may include a system intake duct 72 configured to transmit combustion air drawn from the atmosphere or other sources, and a system exhaust duct 74 configured to exhaust fluids following passage through the furnace 12, regenerator ducts 76, 78 configured to transmit combustion air from intake duct 72 to regenerators 42, 44 and exhaust fluids from regenerators 42, 44 to exhaust duct 74. System 16 also may include a preheater outlet duct 80 configured to transmit exhaust fluids from preheater outlet 70 to fan 34, branch ducts 82, 84 configured to transmit portions of the exhaust fluids from preheater 14 for combination with combustion air input to regenerators 42, 44 and combustion air exiting regenerators 42, 44 through intermediate ports 66, and a preheater intake duct 86 configured to transmit a mixture of combustion air exiting intermediate ports 66 of regenerators 42, 44 and exhaust fluids from preheater 14 to preheater inlet 68. Branch duct 82 may be a preheater exhaust duct, whereas branch duct 84 may be a preheater recirculation duct. It should be understood, however, that additional ducts may form a part of duct system 16.

Sensors 18, 20, 22 provide an indication of various conditions within system 10. Sensor 18 comprises a temperature sensor and is configured to generate a temperature signal indicative of a temperature of fluid flowing to the preheater, e.g., proximate fluid inlet 68 of preheater 14. Temperature sensor 18 may be disposed within or near preheater intake duct 86 and may be proximate fluid inlet 68. Sensor 18 senses temperature of fluid in the preheater intake duct 86. Sensor 18 may comprise any of a variety of temperature sensors including thermistors or thermocouples. Sensors 20, 22 comprise pressure sensors and are configured to generate pressure signals indicative of a change in pressure on either side or across intermediate ports 66 in regenerators 42, 44, respectively. Sensors 20, 22 may comprise any of a variety of pressure sensors including piezoresistive, piezoelectric, capacitive, resonant or other sensors. Although the illustrated embodiment shows selected temperature and pressure sensors relevant to the present disclosure, it should be understood that other temperature and pressure sensors may be disposed throughout system 10 and used in various control processes.

Fluid control valves 24, 26, 28, 30, 32 are provided to control the flow of fluids within duct system 16. Valves 24, 26, 28, 30, 32 may assume a variety of structures including butterfly valves or any other valves suitable for use in a furnace system. It should be understood, however, that additional valves and ducts may form a part of duct system 16.

Regenerator flow valve 24 is provided to control the direction of fluid flow from intake duct 72 to regenerator ducts 76, 78 and the direction of fluid flow from regenerator ducts 76, 78 to exhaust duct 74. Valve 24 is configured to assume a first position in a forward operating mode of furnace system 10 in which combustion air from intake duct 72 is directed through regenerator duct 76 to lower port 60 in regenerator 42 and exhaust fluids from regenerator 44 are directed from regenerator duct 78 to exhaust duct 74. Valve 24 is further configured to assume a second position in a reverse operating mode of furnace system 10 in which combustion air from intake duct 72 is directed through regenerator duct 78 to lower port 60 in regenerator 44 and exhaust fluids from regenerator 42 are directed from regenerator duct 76 to exhaust duct 74. Valve 24 may be controlled by electromechanical controls responsive to a control signal generated by controller 36 in responsive to the passage of time and/or other predetermined or desirable conditions.

Valves 26, 28 comprise shutoff valves and are provided to prevent regenerator exhaust fluids from regenerators 44, 42, respectively, from entering preheater 14. Valve 26 may be disposed within a branch of preheater intake duct 86 between intermediate port 66 in regenerator 44 and fluid inlet 68 of preheater 14. Valve 26 is configured to prevent fluid flow between regenerator 44 and preheater 14 during a forward operating mode of system 10. Valve 26 assumes a closed position during the forward operating mode of system 10 and an open position during the reverse operating mode of system 10. Valve 28 may be disposed within a branch of preheater intake duct 86 between intermediate port 66 in regenerator 42 and fluid inlet 68 of preheater 14. Valve 28 is configured to prevent fluid flow between regenerator 42 and preheater 14 during a reverse operation mode of system 10. Valve 28 assumes a closed position during the reverse operating mode of system 10 and an open position during the forward operating mode of system 10.

Preheater recirculation valve 30 is provided to control the amount of fluid flow from fluid outlet 70 of preheater 14 into preheater intake duct 86 in order to control the temperature of the fluid flow into preheater 14. Valve 30 may be responsive to a control signal generated by controller 36 in response to a temperature signal generated by temperature sensor 18. In particular, valve 30 may be configured to reduce or eliminate fluid flow from fluid outlet 70 of preheater 14 into duct 86 if the temperature signal indicates that the temperature proximate fluid inlet 68 is below a predetermined or desirable threshold (e.g., 450 degrees Celsius) desired to preheat cullet. Valve 30 may be configured to increase fluid flow from fluid outlet 70 of preheater 14 into duct 86 if the temperature signal indicates that the temperature proximate fluid inlet 68 is greater than the predetermined or desirable threshold.

System recirculation valve 32 is configured to control an amount of flow of exhaust fluids away from the preheater outlet duct 80 and the branch duct 84 and thereby control an amount of fluid flow from fluid outlet 70 of preheater 14 to intake duct 72. Valve 32 is used to redirect remaining fluid from fluid outlet 70 that is not being used by valve 30 to cool the fluid in duct 86, to the intake duct 72.

Fan 34 is provided to draw fluids from preheater outlet duct 80 into branch ducts 82, 84. The speed of fan 34 may be varied in response to pressure signals generated by pressure sensors 20, 22 in order control the amount of fluid flow through branch ducts 82, 84. A goal for varying the amount of fluid flow using fan 34 is to use most of the incoming energy from the fluid in duct 86 to preheat the cullet going through the cullet preheater 14, which may be at variable flow rates. The variability of the flow allows more flexibility to the overall system.

Controller 36 is provided to control the position of valves 24, 26, 28, 30, 32 and the speed of fan 34. Although a single controller 36 is shown in the drawings, it should be understood that the control of valves 24, 26, 28, 30, 32 and fan 34 and other elements of system 10 could be divided among separate and independent controllers. Controller 36 may be a programmable microprocessor, application specific integrated circuits (ASICs), a computer, a programmable logic controller, and/or any other suitable type of device for receiving input signals from an operator and/or equipment, processing the receiving input signals in view of stored instructions and/or data to produce output signals, and transmitting the output signals to the operator and/or the equipment. Although not separately shown, the controller 36 generally may include one or more memory devices, one or more processors coupled to the memory device(s), one or more input and/or output interfaces coupled to the processor(s) through which the controller 36 may receive of input signals including signals generated by sensors 18, 20, 22 and generate output signals including those used to control valves 24, 26, 28, 30, 32, and fan 34. Likewise, although not separately shown, the controller 36 may also include ancillary devices, for example, clocks, internal power supplies, visual displays, keyboards or other human input devices, and the like. Controller 36 may be powered by plant electrical power, utility electrical power, battery electrical power, or in any other suitable manner.

In accordance with the present disclosure, controller 36 may be configured (encoded) with sets of executable instructions from a computer program (i.e., software) to perform methods for controlling the mass flow and temperature of fluids within portions of system 10 and, in particular, for controlling valves 24, 26, 28, 30, 32 and fan 34 to achieve control of the mass flow and temperature. More specifically, controller 36 is in communication with temperature sensor 18 and recirculation valve 30 to receive temperature input signals from temperature sensor 18 indicative of temperature of the mixture of combustion air and recirculated exhaust fluids in preheater intake duct 86, to process the temperature input signals, and to transmit valve position output signals to recirculation valve 30 to adjust an opening amount of recirculation valve 30 to control the temperature of the mixture of combustion air and recirculated exhaust fluids in the preheater intake duct 86. Also, controller 36 transmits output signals to preheater exhaust valve 32 to control an opening amount of preheater exhaust valve 32. Further, controller 36 transmits fan speed output signals to fan 34 to control the speed of fan 34 to control the amount of fluid flow through preheater recirculation duct 84. Additionally, controller 36 receives and processes pressure input signals from respective pressure sensors 20, 22 indicative of a pressure differential across a respective intermediate port 66 of the respective regenerator 42, 44, to produce the fan speed output signals.

Furnace system 10 operates in the following manner. During a forward operating mode, combustion air is fed through intake duct 72 and regenerator duct 76 to lower port 60 of regenerator 42. Prior to entry into lower port 60, a portion of the fluids exhausted by preheater 14 through fluid outlet 70 is passed through preheater outlet duct 80, fan 34 and branch duct 82 and is mixed with the combustion air (e.g., by introduction into intake duct 72). In accordance with one embodiment of the present disclosure, the amount of combustion air introduced through intake duct 72 is about eighty-three (83) percent (e.g., between seventy-five (75) and ninety (90) percent including all ranges, sub-ranges, and endpoints in the aforementioned range) of the combustion air flow required by system 10 for melting tank 40. The amount of preheater exhaust fluids introduced into the combustion air stream is about thirty (30) percent (e.g., between twenty-five (25) percent and thirty-five (35) percent including all ranges, sub-ranges, and endpoints in the aforementioned range). In a specific implementation, the amount may be twenty-nine (29) percent of the combustion air flow required by system 10 for melting tank 40. The combined fluid stream therefore includes additional mass that can eventually be diverted for use in preheater 14. The combined fluid stream passes through regenerator 42 where it is heated to about 1220 degrees Celsius.

A majority portion of the fluid stream exits regenerator 42 at upper ports 62 and travels into firing passages 64 where it is mixed with fuel and ignited to transfer heat into melting tank 40 through ports 46 of tank 40. A minority portion of the fluid stream exits regenerator 42 through intermediate ports 66 and into preheater intake duct 86 through valve 28 which is an open position. This portion is mixed with another portion of the exhaust fluids from preheater 14 which exit the preheater 14 at preheater outlet 70 and pass through preheater outlet duct 80, fan 34 and branch duct 84 before entry into preheater intake or inlet duct 86. This portion of the preheater exhaust fluids has a lower temperature (e.g., about 120 degrees Celsius) than the combustion air exiting intermediate port 66 in regenerator 42.

As a result, the temperature of the combined fluid stream is reduced to about 450 degrees Celsius within preheater intake duct 86 and prior to entry into preheater 14 through preheater inlet 68. Temperature sensor 18 monitors the temperature in duct 86, e.g., proximate preheater inlet 68, and is used by controller 36 to adjust the position of valve 30 to control mass flow from bypass duct 84 into preheater intake duct 86 in order to maintain a predetermined or desirable temperature. Exhaust fluids from melting tank 40 exit through ports 48 in tank 40 and pass through firing passages 64 before entering upper ports 62 of regenerator 44. Valve 26 is maintained in a closed position to prevent exhaust fluids from regenerator 44 from entering the fluid stream directed to preheater 14. The exhaust fluids exiting tank 40 may have a temperature of about 1450 degrees Celsius. The exhaust fluids pass through regenerator 44 and transfer heat to the arrangement 50 of bricks, tiles and/or stones in regenerator 44. The exhaust fluids exit lower port 60 at a temperature of about 450 degrees Celsius and pass through regenerator duct 78 and exhaust duct 74.

Based on predetermined or desirable conditions (e.g., passage of time, temperature measurements and/or other conditions), controller 36 eventually reverses the operation of furnace 12. In particular, controller 36 changes the position of valve 24 to move system 10 into a reverse operating mode. In the reverse operation mode, system 10 operates in a substantially similar manner to the forward operating mode, but the flow of fluids through tank 40 and regenerators 42, 44 is reversed and the positions of valves 26, 28, are switched.

The furnace system 10 in accordance with the present disclosure represents an improvement over conventional furnace systems. In particular, the inventive furnace system 10 enables effective use of a preheater 14 with a regenerative furnace 12 thereby enhancing the ability of different materials to mix within the melting tank 40 of the furnace 12, increasing the capacity of the furnace 12, and improving the efficiency of the furnace 12.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A furnace system, comprising:

a regenerative furnace including a melting tank having first and second fluid ports, a first regenerator having a lower port, an upper port in fluid communication with the first fluid port of the melting tank, and an intermediate port disposed between the lower and upper ports of the first regenerator, and a second regenerator having a lower port, an upper port in fluid communication with the second fluid port of the melting tank, and an intermediate port disposed between the lower and upper ports of the second regenerator, wherein, in a forward operating mode, combustion air enters the lower port of the first regenerator and exits the upper port of the first regenerator into the melting tank and exhaust fluids from the melting tank enter the upper port of the second regenerator and exit the lower port of the second regenerator and, in a reverse operating mode, combustion air enters the lower port of the second regenerator and exits the upper port of the second regenerator into the melting tank and exhaust fluids from the melting tank enter the upper port of the first regenerator and exit the lower port of the first regenerator; and a preheater for preheating materials supplied to the melting tank, the preheater including a fluid inlet and a fluid outlet, wherein a first portion of the combustion air traveling through the first regenerator in the forward operating mode is diverted through the intermediate port of the first regenerator prior to reaching the upper port of the first regenerator and mixed with fluids exhausted from the fluid outlet of the preheater before delivery to the fluid inlet of the preheater and a second portion of the combustion air traveling through the second regenerator in the reverse operating mode is diverted through the intermediate port of the second regenerator prior to reaching the upper port of the second regenerator and mixed with fluids exhausted from the fluid outlet of the preheater before delivery to the fluid inlet of the preheater.

2. The furnace system of claim 1, wherein the materials comprise cullet.

3. The furnace system of claim 1, wherein the first portion of the combustion air traveling through the first regenerator in the forward operating mode diverted through the intermediate port of the first regenerator comprises about thirty percent of the combustion air travelling through the first regenerator.

4. The furnace system of claim 1, wherein the intermediate port of the first regenerator is disposed at an apex of the first regenerator or in a side wall relatively proximate a ceiling of the first regenerator.

5. The furnace system of claim 1, further comprising:

a pressure sensor configured to generate a pressure differential signal indicative of a difference in pressure across the intermediate port of the second regenerator; and, a fan configured to control an amount of fluid flow from the fluid outlet of the preheater responsive to the pressure differential signal.

6. The furnace system of claim 1, further comprising:

a temperature sensor configured to generate a temperature signal indicative of a temperature of fluid flowing to the preheater; and, a valve configured to control, responsive to the temperature signal, an amount of fluid flow from the fluid outlet of the preheater that is mixed with the first and second portions of combustion air.

7. The furnace system of claim 1, further comprising:

a first shut off valve disposed between the intermediate port of the second regenerator and the fluid inlet of the preheater and configured to prevent fluid flow from the intermediate port of the second regenerator to the fluid inlet of the preheater during the forward operating mode; and, a second shut off valve disposed between the intermediate port of the first regenerator and the fluid inlet of the preheater and configured to prevent fluid flow from the intermediate port of the first regenerator to the fluid inlet of the preheater during the reverse operating mode.

8. The furnace system of claim 1, wherein a portion of the fluids exhausted from the fluid outlet of the preheater is mixed with the combustion air prior to introduction of the combustion air into the first regenerator in the forward operating mode, and another portion of the fluids exhausted from the fluid outlet of the preheater is mixed with the combustion air prior to introduction of the combustion air into the second regenerator in the reverse operating mode.

9. A furnace system, comprising:

a preheater for preheating materials to be supplied to a melting tank, the preheater including a fluid inlet and a fluid outlet;

a duct system in fluid communication with the preheater, and including a preheater outlet duct to transmit exhaust fluids from the fluid outlet of the preheater, a preheater intake duct to transmit a mixture of combustion air and recirculated exhaust fluids from the fluid outlet of the preheater to the fluid inlet of the preheater, a preheater recirculation duct to transmit a portion of the exhaust fluids from the preheater outlet duct to the preheater intake duct, and a preheater exhaust duct to transmit another portion of the exhaust fluids from the preheater outlet duct out of the duct system;

a recirculation valve to control an amount of flow of exhaust fluids from the preheater outlet duct into the preheater intake duct to control a temperature of the mixture of combustion air and recirculated exhaust fluids into the preheater;

a temperature sensor to generate a temperature signal indicative of a fluid temperature between the fluid inlet of the preheater and a junction of the preheater recirculation duct and the preheater intake duct;

a regenerative furnace including a melting tank having a fluid port, and a regenerator having a lower port, an upper port in fluid communication with the fluid port of the melting tank, and an intermediate port disposed between the lower and upper ports;

a pressure sensor configured to generate a pressure differential signal indicative of a difference in pressure across the intermediate port of the regenerator;

a fan configured to control an amount of fluid flow from the fluid outlet of the preheater responsive to the pressure differential signal; and a controller in communication with the temperature sensor and the recirculation valve to receive temperature input signals from the temperature sensor indicative of temperature of the mixture of combustion air and recirculated exhaust fluids in the preheater intake duct, to process the temperature input signals, and to transmit valve position output signals to the recirculation valve to adjust an opening amount of the recirculation valve to control the temperature of the mixture of combustion air and recirculated exhaust fluids in the preheater intake duct, and wherein the controller is also in communication with the pressure sensor and the fan to receive and process the pressure differential signal from the pressure sensor to produce fan speed output signals to the fan.

10. The furnace system of claim 9, further comprising:

a preheater exhaust valve to control an amount of flow of exhaust fluids away from the preheater outlet duct and the preheater recirculation duct, wherein the controller transmits output signals to the preheater exhaust valve to control an opening amount of the preheater exhaust valve.

11. The furnace system of claim 9, further comprising:

a fan to draw the exhaust fluids from the preheater outlet duct into the preheater recirculation duct and the preheater exhaust duct;

wherein the controller transmits fan speed output signals to the fan to control a speed of the fan to control the amount of fluid flow through the preheater recirculation duct.

12. A furnace system, comprising:

a preheater for preheating materials to be supplied to a melting tank, the preheater including a fluid inlet and a fluid outlet;

a duct system in fluid communication with the preheater, and including a preheater outlet duct to transmit exhaust fluids from the fluid outlet of the preheater, a preheater intake duct to transmit a mixture of combustion air and recirculated exhaust fluids from the fluid outlet of the preheater to the fluid inlet of the preheater, a preheater recirculation duct to transmit a portion of the exhaust fluids from the preheater outlet duct to the preheater intake duct, and a preheater exhaust duct to transmit another portion of the exhaust fluids from the preheater outlet duct out of the duct system;

a recirculation valve to control an amount of flow of exhaust fluids from the preheater outlet duct into the preheater intake duct to control a temperature of the mixture of combustion air and recirculated exhaust fluids into the preheater;

a temperature sensor to generate a temperature signal indicative of a fluid temperature between the fluid inlet of the preheater and a junction of the preheater recirculation duct and the preheater intake duct;

a fan to draw the exhaust fluids from the preheater outlet duct into the preheater recirculation duct and the preheater exhaust duct;

a controller in communication with the temperature sensor and the recirculation valve to receive temperature input signals from the temperature sensor indicative of temperature of the mixture of combustion air and recirculated exhaust fluids in the preheater intake duct, to process the temperature input signals, and to transmit valve position output signals to the recirculation valve to adjust an opening amount of the recirculation valve to control the temperature of the mixture of combustion air and recirculated exhaust fluids in the preheater intake duct, and wherein the controller transmits fan speed output signals to the fan to control a speed of the fan to control the amount of fluid flow through the preheater recirculation duct; and a regenerative furnace including furnace regenerator pressure sensors, wherein the controller receives and processes pressure input signals from the furnace regenerator pressure sensors to produce the fan speed output signals.

13. A furnace system, comprising:

a regenerative furnace including a melting tank and at least one regenerator configured to operate in forward and reverse modes and having an intermediate port for diverting a portion of combustion air;

a preheater for preheating materials supplied to the melting tank, the preheater including a fluid inlet and a fluid outlet;

a duct system in fluid communication with the preheater and the at least one regenerator, and configured to transmit a mixture of combustion air diverted from the intermediate port of the at least one regenerator and recirculated exhaust fluids from the fluid outlet of the preheater to the fluid inlet of the preheater;

a recirculation valve configured to control a flow of the recirculated exhaust fluids from the fluid outlet of the preheater into the duct system;

a temperature sensor configured to sense a temperature of the mixture; and a controller in communication with the temperature sensor and the recirculation valve and configured to adjust the recirculation valve responsive to the temperature sensor to control the temperature of the mixture delivered to the preheater.

14. The furnace system of claim 13, wherein the melting tank has first and second fluid ports, and the at least one regenerator includes a first regenerator having a first lower port, a first upper port in fluid communication with the first fluid port of the melting tank, and a first intermediate port disposed between the first lower and upper ports of the first regenerator, and a second regenerator having a second lower port, a second upper port in fluid communication with the second fluid port of the melting tank, and a second intermediate port disposed between the second lower and upper ports of the second regenerator.

15. The furnace system of claim 14, wherein, in a forward operating mode, combustion air enters the first lower port of the first regenerator and exits the first upper port of the first regenerator into the melting tank and exhaust fluids from the melting tank enter the second upper port of the second regenerator and exit the second lower port of the second regenerator and, in a reverse operating mode, combustion air enters the second lower port of the second regenerator and exits the second upper port of the second regenerator into the melting tank and exhaust fluids from the melting tank enter the first upper port of the first regenerator and exit the first lower port of the first regenerator.

16. The furnace system of claim 15, wherein a first portion of the combustion air traveling through the first regenerator in the forward operating mode is diverted through the first intermediate port of the first regenerator prior to reaching the first upper port of the first regenerator and mixed with fluids exhausted from the fluid outlet of the preheater before delivery to the fluid inlet of the preheater and a second portion of the combustion air traveling through the second regenerator in the reverse operating mode is diverted through the second intermediate port of the second regenerator prior to reaching the second upper port of the second regenerator and mixed with fluids exhausted from the fluid outlet of the preheater before delivery to the fluid inlet of the preheater.

17. The furnace system of claim 13, wherein the duct system includes a preheater outlet duct to transmit exhaust fluids from the fluid outlet of the preheater, a preheater intake duct to transmit a mixture of combustion air and recirculated exhaust fluids from the fluid outlet of the preheater to the fluid inlet of the preheater, a preheater recirculation duct to transmit a portion of the exhaust fluids from the preheater outlet duct to the preheater intake duct, and a preheater exhaust duct to transmit another portion of the exhaust fluids from the preheater outlet duct out of the duct system.

18. The furnace system of claim 17, wherein the recirculation valve is configured to control a temperature of the mixture of combustion air and recirculated exhaust fluids into the preheater, the temperature sensor is configured to generate a temperature signal indicative of a fluid temperature between the fluid inlet of the preheater and a junction of the preheater recirculation duct and the preheater intake duct, and the melting tank has of the regenerative furnace has a fluid port, and the at least one regenerator has a lower port, an upper port in fluid communication with the fluid port of the melting tank, and the intermediate port disposed between the lower and upper ports.

19. The furnace system of claim 18, further comprising:

a pressure sensor configured to generate a pressure differential signal indicative of a difference in pressure across the intermediate port of the regenerator; and a fan configured to control an amount of fluid flow from the fluid outlet of the preheater responsive to the pressure differential signal.

20. The furnace system of claim 19, wherein the controller is configured to receive temperature input signals from the temperature sensor indicative of temperature of the mixture of combustion air and recirculated exhaust fluids in the preheater intake duct, to process the temperature input signals, and to transmit valve position output signals to the recirculation valve to adjust an opening amount of the recirculation valve to control the temperature of the mixture of combustion air and recirculated exhaust fluids in the preheater intake duct.

* * * * *